No. 619,453. Patented Feb. 14, 1899.
J. P. WARNER, Dec'd.
R. P. WARNER, Administrator.
PNEUMATIC TIRE.
(Application filed Dec. 21, 1897.)
(No Model.)
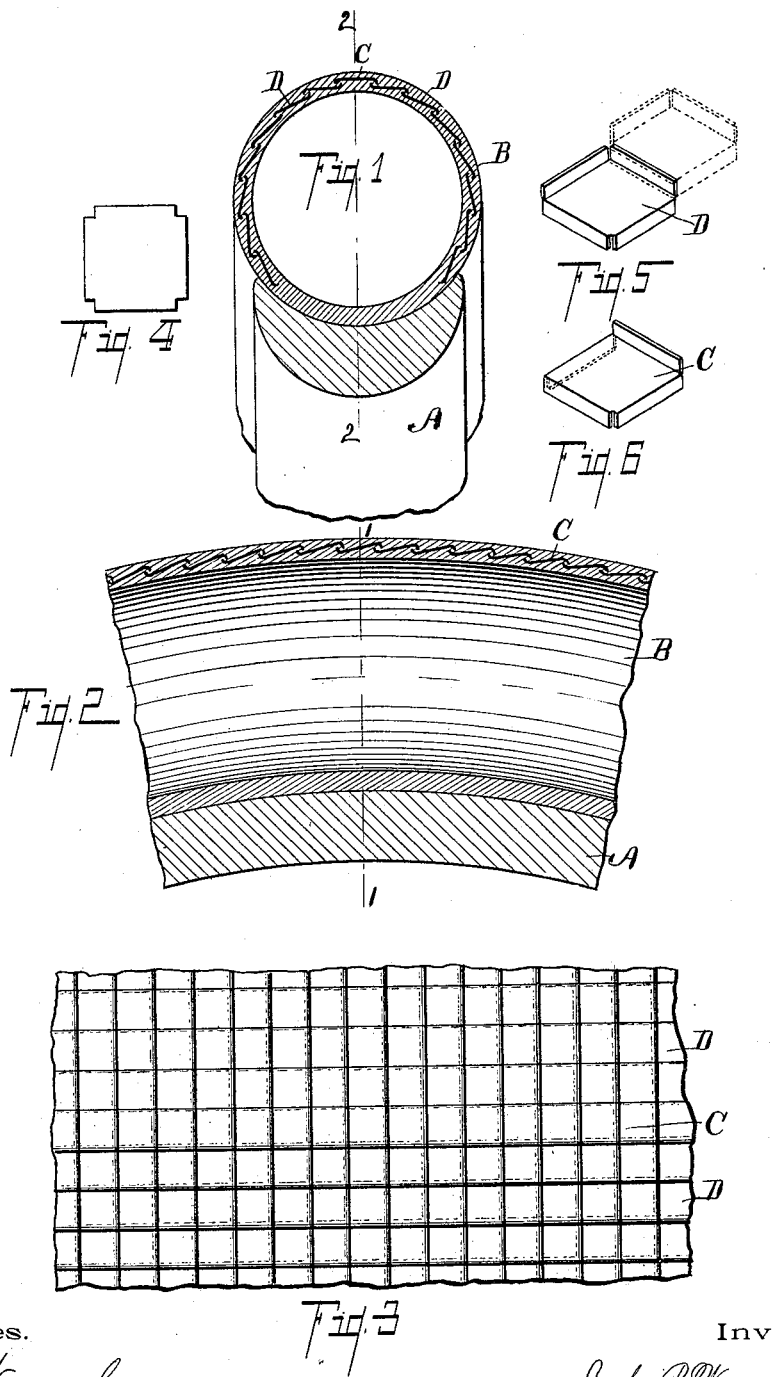
Witnesses.
W. S. Wood
Otis A. Earl
Inventor.
Jasper P. Warner
By Fred L. Chappell
Attorney.

UNITED STATES PATENT OFFICE.

JASPER P. WARNER, OF DECATUR, MICHIGAN; ROE P. WARNER ADMINISTRATOR OF SAID JASPER P. WARNER, DECEASED.

PNEUMATIC TIRE.

SPECIFICATION forming part of Letters Patent No. 619,453, dated February 14, 1899.

Application filed December 21, 1897. Serial No. 662,904. (No model.)

*To all whom it may concern:*

Be it known that I, JASPER P. WARNER, a citizen of the United States, residing at the village of Decatur, in the county of Van Buren and State of Michigan, have invented certain new and useful Improvements in Pneumatic Tires, of which the following is a specification.

This invention relates to improvements in pneumatic tires for bicycles and for vehicles generally. As heretofore constructed these tires have been liable to punctures, although there have been repeated attempts to utilize armor of metal for the same. All previous attempts to use metal as an armor have been failures, owing to the fact that at certain points the tube is vulnerable or capable of being punctured or else the plates of metal have been unyielding and the elasticity of the tires has consequently been destroyed.

It is the object of this invention to provide, first, an improved construction of pneumatic tire in which the protection against punctures is complete; second, to provide an improved armor-plating for pneumatic tires in which the flexibility and consequent resiliency of the inflated tire is fully preserved. Further objects will definitely appear in the detailed description to follow. I accomplish these objects of my invention by the devices and means described in this specification.

The invention is clearly pointed out, and defined in the claims.

The structure is clearly shown in the accompanying drawings, forming a part of this specification, in which—

Figure 1 is a detail sectional view through a portion of tire and wheel-rim, taken on a line corresponding to line 1 1 of Fig. 2. Fig. 2 is a longitudinal sectional view through a portion of tire and wheel-rim, taken on a line corresponding to line 2 2 of Fig. 1. Fig. 3 is an enlarged detail plan view of a portion of the armor of the tire spread out flat. Fig. 4 is an enlarged detail view of a blank for one of the armor-plates. Fig. 5 is a detailed view of one of the armor-plates D, showing the method of arranging the same in connection with other such plates, a second plate being indicated by dotted lines. Fig. 6 is a detailed perspective view of one of the armor-plates C.

In the drawings similar letters of reference refer to similar parts throughout the several views.

Referring to the lettered parts of the drawings, A represents a portion of the rim of a wheel, as a bicycle-wheel. B is the tire. The tire is here shown as made up homogeneous, but it is well known in the art that tires are made up of layers of canvas and rubber appropriately arranged. In this connection I desire to state that it is preferred to use my improved armor-plating in connection with rubber tires constructed in the most approved manner of combined rubber and canvas or any other material found suitable; but as my invention does not relate to the arrangement of these different layers I have preferred not to show the same, as they would tend to confuse the illustrating of my invention.

My improved armor-plating for a tire consists of a large number of small plates which are lapped and interlocked together, as will be hereinafter described. Beginning on each side of the tire rows of plates D are lapped over each other—that is, the front end of one scale projects under the rear end of the one preceding—and the edges are bent so that they would engage over each other if placed in proximity. It will be observed that this will prevent the passage of any pointed object between the plates at this point, because the upper curved edge of the under plate will engage the point and retain it, and if the point travels in the opposite direction it will be steered onto the next plate. The edges of these plates toward the rim hook in and those away from the rim of the tire hook out, and they are placed in rows in this way. The plates of each row are overlapping, and the rows of plates overlap with the outwardly-hooked edge under, as clearly appears by referring to Figs. 1 and 2. When these plates reach the center of the tire from each side, then a specially-formed row of plates C (clearly appearing in Fig. 6) laps over the outwardly-hooking edge of each adjacent row of plates D, forming complete protection at this point, so that practically a pointed article striking the bottom of the tire would be steered off to the other side, merely marking the rubber down to the plate. In placing these plates in position it is preferred that a thin layer of rubber be put between them, and when the tire is complete the whole is properly vulcanized, and as the plates do not come in contact with each other and engage each other positively and are all made very small, preferably less than one-fourth of an inch in size, the flexibility of the tire is in no wise interfered with.

The material of which I prefer to construct the plates of my improved tire is preferably aluminium-bronze on account of its light weight, its freedom from corrosion, and its great strength. I, however, am aware that other materials may be adapted for use in this form, and do not wish to be confined to the exact material used. It may be found that thin sheet-steel will in practice be best, both materials not having yet been tested.

Having thus described my invention, what I claim as new, and desire to secure by Letters Patent, is—

The combination of a suitable inflatable tire made up of flexible material; and overlapping armor-plates supported in rows at each side, the edges of which interlock, the rows at each side projecting under the next succeeding row from the rim outward, and the row at the center or outer periphery of the tire overlapping the outer edges of the next adjacent rows at each side so that the edges of all of the plates and rows interlock and the plates overlap outwardly from the periphery of the tire in both directions, as specified.

In witness whereof I have hereunto set my hand and seal in the presence of two witnesses.

JASPER P. WARNER. [L. S.]

Witnesses:
 GEO. H. KEMPF,
 WILL JESSUP.